(12) United States Patent
Kato et al.

(10) Patent No.: US 9,915,325 B2
(45) Date of Patent: Mar. 13, 2018

(54) CHAIN TRANSMISSION DEVICE

(71) Applicant: NTN CORPORATION, Osaka (JP)

(72) Inventors: Akio Kato, Shizuoka (JP); Takahiro Yamashita, Shizuoka (JP); Hisataka Hasegawa, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/917,386

(22) PCT Filed: Sep. 11, 2014

(86) PCT No.: PCT/JP2014/074057
§ 371 (c)(1),
(2) Date: Mar. 8, 2016

(87) PCT Pub. No.: WO2015/041133
PCT Pub. Date: Mar. 26, 2015

(65) Prior Publication Data
US 2016/0215861 A1  Jul. 28, 2016

(30) Foreign Application Priority Data
Sep. 17, 2013 (JP) ................. 2013-191470

(51) Int. Cl.
*F16H 7/20* (2006.01)
*F16H 7/18* (2006.01)
(Continued)

(52) U.S. Cl.
CPC ............. *F16H 7/20* (2013.01); *F16H 7/06* (2013.01); *F16H 7/18* (2013.01);
(Continued)

(58) Field of Classification Search
CPC ............. F16H 7/20; F16H 7/06; F16H 7/18
(Continued)

(56) References Cited

U.S. PATENT DOCUMENTS 7,387,584 B2 * 6/2008 Miyata ................ F16H 7/12
474/197
9,261,170 B2 * 2/2016 Kato .................... F16H 7/18
(Continued)

FOREIGN PATENT DOCUMENTS

CN  1419063  5/2003
CN  1626782  6/2005
(Continued)

OTHER PUBLICATIONS

International Search Report dated Dec. 16, 2014 in corresponding International Application No. PCT/JP2014/074057 (with English translation).
(Continued)

*Primary Examiner* — William E Dondero
*Assistant Examiner* — Mark K Buse
(74) *Attorney, Agent, or Firm* — Wenderoth, Lind & Ponack, L.L.P.

(57) ABSTRACT

A chain transmission device includes chain guides capable of guiding a chain. The chain guides include a plurality of spaced apart rollers for guiding the chain, and a distance L (m) between contact points of a trained portion of the chain is set to satisfy the following inequality:

$$L < \frac{1}{2\omega_{MAX}} \sqrt{\frac{T}{\rho}},$$

where $\omega_{MAX}$ is a maximum excitation frequency (Hz) from a crankshaft, $\rho$ is a mass of the chain per unit length (kg/m), and T is a time-average tension of the chain (N).

4 Claims, 2 Drawing Sheets

(51) Int. Cl.
*F16H 7/06* (2006.01)
*F16H 7/08* (2006.01)

(52) U.S. Cl.
CPC ............... *F16H 2007/0865* (2013.01); *F16H 2007/0872* (2013.01); *F16H 2007/0893* (2013.01)

(58) Field of Classification Search
USPC ........................................................ 474/134
See application file for complete search history.

(56) References Cited

U.S. PATENT DOCUMENTS

| | | | | |
|---|---|---|---|---|
| 9,429,216 B2* | 8/2016 | Kato | ................... | F16H 7/18 |
| 2002/0094896 A1* | 7/2002 | Nakamura | ................. | F16H 7/02 |
| | | | | 474/238 |
| 2003/0092521 A1 | 5/2003 | Konno | | |
| 2005/0130776 A1 | 6/2005 | Markley et al. | | |
| 2009/0143177 A1* | 6/2009 | Nakano | ................. | F01L 1/02 |
| | | | | 474/109 |
| 2011/0294612 A1* | 12/2011 | Kato | ................... | F16H 7/08 |
| | | | | 474/91 |
| 2013/0331211 A1* | 12/2013 | Kato | ................... | F16H 7/18 |
| | | | | 474/101 |
| 2014/0155208 A1* | 6/2014 | Kato | ................... | F02B 67/06 |
| | | | | 474/111 |
| 2014/0155209 A1* | 6/2014 | Kato | ................... | F16H 7/20 |
| | | | | 474/118 |
| 2014/0162820 A1* | 6/2014 | Kato | ................... | F16H 7/18 |
| | | | | 474/111 |
| 2014/0179472 A1* | 6/2014 | Kato | ................... | F16H 7/18 |
| | | | | 474/111 |
| 2014/0287861 A1* | 9/2014 | Kato | ................... | F16H 7/18 |
| | | | | 474/136 |

FOREIGN PATENT DOCUMENTS

| | | | |
|---|---|---|---|
| JP | 1-167412 | | 7/1989 |
| JP | 2001-187948 | | 7/2001 |
| JP | 2002-48202 | | 2/2002 |
| JP | 2002-213547 | | 7/2002 |
| JP | 2007-113666 | | 5/2007 |
| JP | 2009-228698 | | 10/2009 |
| JP | 2010-48305 | | 3/2010 |
| JP | 2013-32826 | | 2/2013 |
| WO | 2010/090139 | | 8/2010 |
| WO | WO2012114959 | * | 8/2012 |
| WO | 2013/051549 | | 4/2013 |

OTHER PUBLICATIONS

Written Opinion of the International Searching Authority in corresponding International Application No. PCT/JP2014/074057 (with English translation).
Extended European Search Report dated Jan. 23, 2017 in corresponding European Application No. 14846526.3.
Office Action dated Sep. 5, 2017 in Chinese Patent Application No. 201480049266.3, with partial translation.

\* cited by examiner

CHAIN TRANSMISSION DEVICE

TECHNICAL FIELD

The present invention mainly relates to a chain transmission device in which the rotation of a crankshaft of an automobile engine is transmitted to camshafts.

BACKGROUND ART

In an automobile engine, the rotation of a crankshaft is transmitted to camshafts by means of a timing chain made of iron (hereinafter, simply referred to as a "chain") so as to rotate the camshafts, thereby opening and closing valves of combustion chambers.

Chain transmission devices are used to drive such camshafts. Many of such chain transmission devices include a crank sprocket attached to a crankshaft of an engine, cam sprockets attached to respective camshafts of the engine, a chain trained around the crank sprocket and the cam sprockets, a loose side chain guide arranged so as to guide the portion of the chain configured to move from the crank sprocket toward one of the cam sprockets, and a tension side chain guide arranged so as to guide the portion of the chain configured to move from the other of the cam sprockets toward the crank sprocket.

As the loose side and tension side chain guides used in such chain transmission devices, sliding-type chain guides are known each having a guiding surface extending along the direction in which the chain moves, and coming into sliding contact with the chain. However, since such sliding-type chain guides are in sliding contact with the chain, there is the problem that the resistance to the movement of the chain is large so that the transmission loss of torque is large.

In order to overcome this problem, the inventors of the present application have proposed a chain guide including a plurality of rollers arranged along the direction in which the chain moves while being spaced apart from each other, and configured to guide a chain (see PCT International Publication No. 2010/090139 and Japanese Unexamined Patent Application Publication No. 2013-032826).

Since this chain guide is in rolling contact with the chain, there is the advantage that the resistance of the movement of the chain is small so that the transmission loss of torque is small.

Problems to be Solved by the Invention

By use of such a rolling-type chain guide as described above, it is possible to reduce the transmission loss of torque. However, on the other hand, such a rolling-type chain guide tends to cause the chain to vibrate more violently, and generate a larger vibration sound.

The inventors of the present application investigated what causes a vibration sound to occur from the chain. As a result of this investigation, it turned out that the string vibration of the straight extending chain occurs at the portion of the chain extending between each sprocket and the roller of the chain guide closest to the sprocket, or at the portion of the chain extending between each adjacent pair of rollers of the chain guide. This string vibration is likely to occur especially at the portion of a loose side chain guide extending between a crank sprocket and the roller of the loose side chain guide closest to the crank sprocket.

The string vibration of the chain seems to be caused by the following point. Namely, since a force is generated only in the combustion stroke of an engine cycle, the rotational force generated in the crankshaft of the engine is not constant, for example, in the case of a four-cylinder engine, each time the crankshaft rotates once, two rotation cycles occur. The two rotation cycles are transmitted to the chain, so that, for example, while the crankshaft is rotating at 7,000 rotations/minute, the chain is excited/vibrated at the frequency $\omega$ of 233.3 Hz. When the number of rotations of the crankshaft changes within the range between 0 (zero) and a maximum value, this excitation frequency $\omega$ changes in accordance with the number of rotations of the crankshaft. When the excitation frequency $\omega_0$ from the crankshaft coincides with the natural frequency $\omega_0$ of the chain at its straight extending portions, the resonance of the chain occurs so that a vibration sound occurs from the chain.

SUMMARY OF THE INVENTION

It is an object of the present invention to provide a chain transmission device in which rolling-type chain guides are used and a chain can be guided quietly.

Means for Solving the Problems

In order to achieve the above object, the present invention provides a chain transmission device comprising: a crank sprocket attached to a crankshaft of an engine; a cam sprocket attached to a camshaft of the engine; a chain trained around the crank sprocket and the cam sprocket; and a chain guide including a plurality of rollers arranged along a direction in which the chain moves while being spaced apart from each other, and configured to guide the chain, wherein the rollers include a first roller and a second roller, and wherein the chain forms a first straight portion extending in a straight line between the crank sprocket and the first roller, and a second straight portion extending in a straight line between the cam sprocket and the second roller, characterized in that each of the first and second straight portions of the chain has contact points which are spaced apart from each other by a distance L, expressed in meters (m), wherein the distance L between the contact points of at least one of the first and second straight portions of the chain is set to satisfy the following inequality (1):

$$L < \frac{1}{2\omega_{MAX}} \sqrt{\frac{T}{\rho}}, \tag{1}$$

where $\omega_{MAX}$ is a maximum excitation frequency, expressed in hertz (Hz), from the crank shaft, $\rho$ is a mass of the chain per unit length, expressed in kilograms per meter (kg/m), and T is a time-average tension of the chain, expressed in newton (N).

The above sentence "the chain forms a first straight portion extending in a straight line between the crank sprocket and the first roller, and a second straight portion extending in a straight line between the cam sprocket and the second roller" means that none of the rollers other than the first and second rollers is kept in contact with the first and second straight portions of the chain. The first/second straight portion of the chain is synonymous with the common tangent of each sprocket and the roller closest to the sprocket and kept in contact with the chain with the rollers of the chain guides kept in contact with the chain.

By setting the distance L as described above, the natural frequency $\omega_0$ of the chain at the trained portion of the chain which satisfies the above inequality (1) shows a value larger than that of the maximum excitation frequency $\omega_{MAX}$ from the crankshaft. As a result thereof, the excitation frequency $\omega$ from the crankshaft never coincides with the natural frequency $\omega_0$. Therefore, it is possible to prevent the resonance of the chain, and thus to restrain the vibration sound of the chain.

This is described in detail below. The natural frequency $\omega_0$ of the chain is obtained by the following formula (2):

$$\omega_0 = \frac{n}{2L}\sqrt{\frac{T}{\rho}} \quad (n = 1, 2, 3, \ldots), \tag{2}$$

where n is any natural number showing vibration mode number and consisting of 1 or over, L is the distance (m) between the contact points of the trained portion of the chain, T is the time-average tension of the chain (N), and P is the mass of the chain per unit length (kg/m). When the distance L is set to satisfy the above inequality (1), the natural frequency $\omega_0$ obtained by the above formula (2) shows a value which satisfies the following formula (3) in all vibration mode numbers:

$$\omega_0 > \omega_{MAX} \tag{3}$$

Namely, the natural frequency $\omega_0$ of the chain always shows a value larger than that of the maximum excitation frequency $\omega_{MAX}$ from the crankshaft. As a result thereof, when the excitation frequency $\omega$ from the crankshaft changes with the range between 0 (zero) and the maximum value $\omega_{MAX}$, the excitation frequency $\omega$ never coincides with the natural frequency $\omega_0$. Therefore, it is possible to prevent the resonance of the chain, and thus to restrain the vibration sound of the chain.

In the above chain transmission device in which the chain guide comprises a loose side chain guide arranged so as to guide the portion of the chain configured to move from the crank sprocket to the cam sprocket, the resonance of the chain is likely to occur especially at the first straight portion of the chain extending between the crank sprocket and the first roller located at the end of the loose side chain guide on the side of the crank sprocket so that a vibration sound is likely to occur especially from the first straight portion of the chain. Due to this reason, it is preferable to set the distance L so as to satisfy the above inequality (1) at at least one of the first and second straight portions of the chain, specifically, at the first straight portion of the chain. By setting the distance L in this way, it is possible to prevent the resonance of the chain which is likely to occur especially at the first straight portion of the chain, and thus to effectively restrain the vibration sound of the chain.

It is more preferable that both of the distance L between the contact points of the first straight portion of the chain and the distance L between the contact points of the second straight portion of the chain are each set to satisfy the inequality (1). By setting the respective distances L in this way, it is possible to prevent the resonance of the chain at both of the first and second straight portions of the chain, and thus to very effectively restrain the vibration sound of the chain.

In the above chain transmission device, comprising: the crank sprocket attached to the crankshaft of the engine; the cam sprocket attached to the camshaft of the engine; the chain trained around the crank sprocket and the cam sprocket; and the chain guide including the plurality of rollers arranged along the direction in which the chain moves while being spaced apart from each other, and configured to guide the chain, wherein the chain has a portion extending between each adjacent pair of the rollers of the chain guide, and having contact points spaced apart from each other by a distance P (m), it is preferable that the distance P (m) between the contact points of at least one of the portions extending between the respective adjacent pairs of the rollers is set to satisfy the following inequality (4):

$$P < \frac{1}{2\omega_{MAX}}\sqrt{\frac{T}{\rho}}, \tag{4}$$

where $\omega_{MAX}$ is the maximum excitation frequency (Hz) from the crank shaft, $\rho$ is the mass of the chain per unit length (kg/m), and T is the time-average tension of the chain (N).

By setting the distance P in this way, it is possible to prevent the resonance of the chain at the extending portion of the chain which satisfies the above inequality (4), and thus to effectively restrain the vibration sound of the chain.

Effects of the Invention

In the chain transmission device according to the present invention, when the excitation frequency $\omega$ from the crankshaft changes with the range between 0 (zero) and the maximum value $\omega_{MAX}$, the excitation frequency $\omega$ never coincides with the natural frequency $\omega_0$ of the chain at the extending portions of the chain at which the distances L are each set to satisfy the inequality (1). Therefore, it is possible to restrain the vibration sound of the chain, and thus to guide the chain very quietly.

BEST MODE FOR CARRYING OUT THE INVENTION

Figure 1:
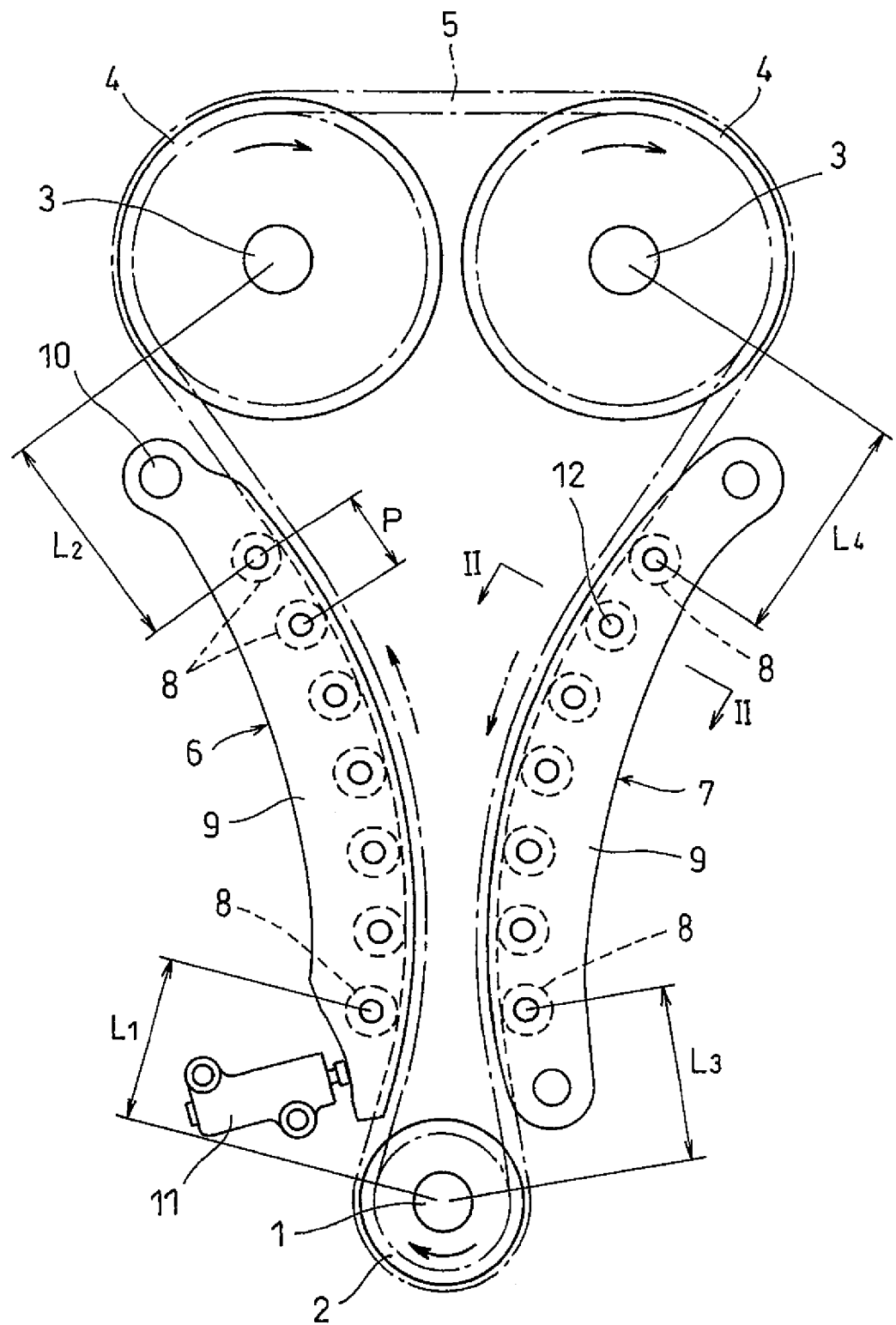
FIG. 1 is a schematic diagram of a chain transmission device according to an embodiment of the present invention.

FIG. 1 illustrates a chain transmission device according to the embodiment of the present invention. This chain transmission device includes a crank sprocket 2 attached to a crankshaft 1 of an engine, left and right cam sprockets 4 attached to respective camshafts 3, and a chain 5 trained around the crank sprocket 2 and the cam sprockets 4. The rotation of the crankshaft 1 is transmitted to the camshafts 3 by means of the chain 5 so as to rotate the camshafts 3, thereby opening and closing valves of combustion chambers (not shown).

While the engine is operating, the crankshaft 1 always rotates in the same direction (clockwise direction in FIG. 1). While the crankshaft 1 is rotating in this direction, the portion of the chain 5 moving from the crank sprocket 2 toward the left cam sprocket 4 (left portion of the chain 5 in FIG. 1) becomes loose (this portion is therefore called "loose side"), while the portion of the chain 5 moving from the (right) cam sprocket 4 toward the crank sprocket 2 (right portion of the chain 5 in FIG. 1) becomes tensioned (this portion is therefore called "tension side"). The chain transmission device further includes a loose side chain guide 6 arranged so as to guide the loose side of the chain 5, and a tension side chain guide 7 arranged so as to guide the tension side of the chain 5.

The loose side chain guide 6 includes a plurality of rollers 8 arranged along the direction in which the chain 5 moves while being spaced from each other, and configured to guide the chain 5, a guide base 9 supporting the rollers 8, a fulcrum shaft 10 supporting the guide base 9 such that the guide base 9 is pivotable about the end portion of the guide base 9 on the side of the cam shaft 3 closer to the fulcrum shaft 10, and a chain tensioner 11 pressing the guide base 9 such that the rollers 8 are pressed against the chain 5.

The tension side chain guide 7 includes a plurality of rollers 8 arranged along the direction in which the chain 5 moves while being spaced apart from each other, and configured to guide the chain 5, and a guide base 9 supporting the rollers 8. The guide base 9 of the chain guide 7 is fixed in position by fastening means such as bolts.

The chain 5 forms a first straight portion extending in a straight line between the crank sprocket 2 and the first roller 8 located at the end of the loose side chain guide 6 on the side of the crank sprocket 2, (namely, forms, as shown at $L_1$ in FIG. 1, the common tangent of this roller 8 and the crank sprocket 2). This means that none of the rollers 8 other than the first roller 8 is kept in contact with the first straight portion of the chain 5.

Similarly, the chain 5 forms a second straight portion extending in a straight line between the left cam sprocket 4 and the second roller 8 located at the end of the loose side chain guide 6 on the side of the left cam sprocket 4 (portion corresponding to $L_2$ of FIG. 1.). The chain 5 further forms a third straight portion extending in a straight line between the crank sprocket 2 and the third roller 8 located at the end of the tension side chain guide 7 on the side of the crank sprocket 2 (portion corresponding to $L_3$ of FIG. 1.), and a fourth straight portion extending in a straight line between the right cam sprocket 4 and the fourth roller 8 located at the end portion of the chain guide 7 on the side of the right cam sprocket 4 (portion corresponding to $L_4$ of FIG. 1.).

Figure 2:
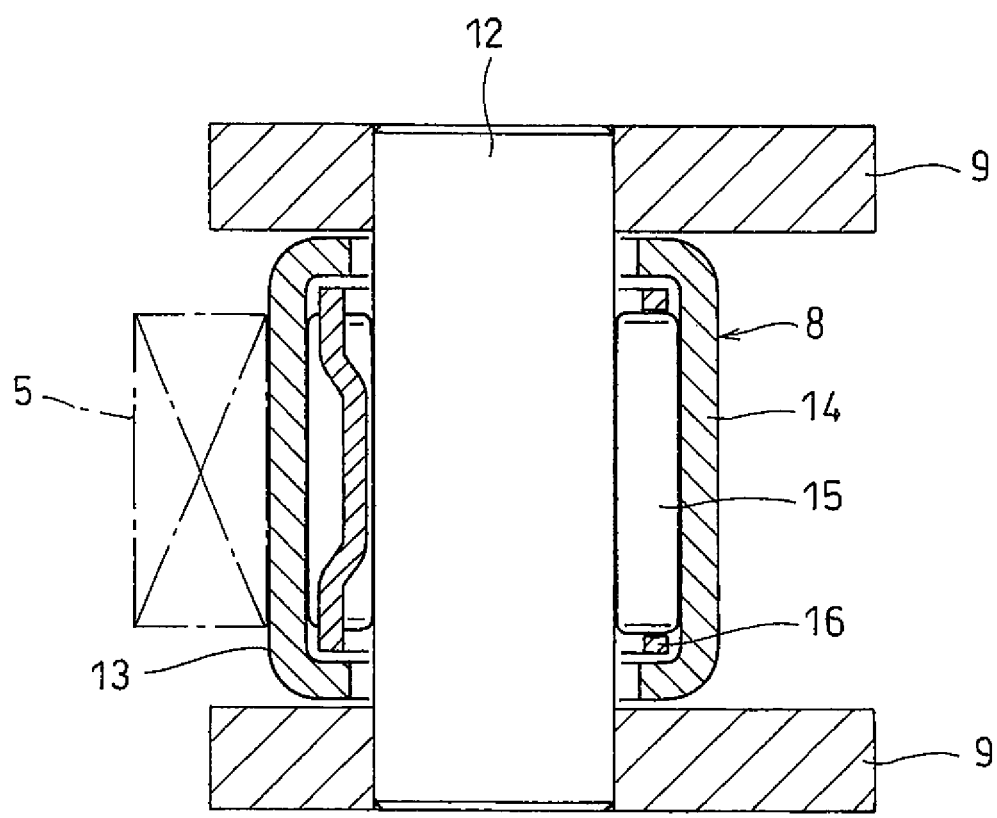
FIG. 2 is a sectional view taken along line II-II of FIG. 1.

As illustrated in FIG. 2, the rollers 8 each includes a roller shaft 12 fixed to the guide base 9, and a rolling bearing 13 mounted on the outer periphery of the roller shaft 12. The rolling bearing 13 is constituted by an outer race 14 kept in contact with the chain 5, a plurality of rolling elements 15 provided inside of the outer race 14, and a retainer 16 retaining the rolling elements 15. The rolling elements 15 are cylindrical roller elements or needle roller elements. The outer race 14 is a shell-type outer race formed by drawing a steel plate into a cup shape. The rollers 8 of the loose side chain guide 6 are identical in structure to the rollers 8 of the tension side chain guide 7.

In this embodiment, in order to reduce the resistance to the movement of the chain 5, the rolling bearings constituting the rollers 8 are configured such that their outer races 14 come into direct contact with the chain 5, thereby minimizing the moment of inertia of the rollers 8. However, the rollers 8 each may further include a guiding member made of resin or metal, and mounted on the outer race 14 so as to come into contact with the chain 5. Instead of the rolling bearings 13, sliding bearings may be used for rotatably supporting the respective rollers 8.

By use of such a rolling-type chain guide as described in this embodiment, the chain guide including the rollers 8 kept in rolling contact with the chain 5, it is possible to reduce the transmission loss of torque, compared to when a sliding-type chain guide which does not include such rollers 8 is used. On the other hand, however, such a rolling-type chain guide tends to cause the chain 5 to vibrate more violently, and generate a larger vibration sound.

In order to reduce the vibration sound of the chain 5, the chain transmission device of this embodiment is configured to satisfy the following inequality (1):

$$L < \frac{1}{2\omega_{MAX}} \sqrt{\frac{T}{\rho}}, \qquad (1)$$

where L is in meters (m), and is any one of:
Distance $L_1$ between the contact points of the portion of the chain 5 extending between the crank sprocket 2 and the roller 8 of the loose side chain guide 6 closest to the crank sprocket 2;
Distance $L_2$ between the contact points of the portion of the chain 5 extending between the left cam sprocket 4 and the roller 8 of the chain guide 6 closest to the left cam sprocket 4;
Distance $L_3$ between the contact points of the portion of the chain 5 extending between the crank sprocket 2 and the roller 8 of the tension side chain guide 7 closest to the crank sprocket 2; and
Distance $L_4$ between the contact points of the portion of the chain 5 extending between the right cam sprocket 4 and the roller 8 of the chain guide 7 closest to the right cam sprocket 4

In the above inequality (1), $\omega_{MAX}$ is the maximum excitation frequency (Hz) from the crank shaft 1, $\rho$ is the mass of the chain 5 per unit length (kg/m), and T is the time-average tension of the chain 5 (N). The "time-average tension of the chain 5" refers to the maximum value of the values obtained by time-averaging of the tension of the chain 5 at the respective stages/rotational speeds when the crankshaft 1 is rotating at a speed ranging between 0 (zero) and a maximum value. The "contact points" mentioned above for setting/defining each of the distances $L_1$ to $L_4$ are now described. The contact point of the chain 5 and each of the four rollers 8 closest to the respective sprockets is the intersection point at which the chain 5 intersects with the line passing through the center of the roller 8 and extending perpendicular to the chain 5. The contact point of the chain 5 and each of the three sprockets 2 and 4 is an intersection point at which the chain 5 intersects with the line passing through the center of the sprocket and extending perpendicular to the straight portion of the chain 5.

In the case of a four-cylinder engine, each time the crankshaft 1 rotates once, two rotation cycles occur, and the two rotation cycles are transmitted to the chain 5 so as to excite/vibrate the chain 5. Therefore, while the engine is running such that the number of rotations of the crankshaft 1 changes within the range between 0 (zero) and 7,000 rotations/minute (about 116.6 rotations/second), the chain 5 is excited/vibrated at the frequency ω which changes within the range between 0 (zero) and 233.3 Hz. At this time, the maximum excitation frequency $\omega_{MAX}$ from the crankshaft 1 is 233.3 Hz. Furthermore, if the mass p of the chain 5 per unit length is 0.35 (kg/m), and the time-average tension T of the chain 5 is 300 (N), by applying the two values to the above inequality (1), the inequality (1) shows L<0.0627. Namely, if each of the distances $L_1$ to $L_4$ is smaller than 62.7 (mm), the inequality (1) is met.

By setting the distances $L_1$ to $L_4$ in this way, natural frequency $\omega_0$ shows a value larger than that of the maximum excitation frequency $\omega_{MAX}$ from the crankshaft 1 at each of the following four portions of the chain 5: the portion of the chain 5 extending between the crank sprocket 2 and the roller 8 of the loose side chain guide 6 closest to the crank sprocket 2 (portion of the chain 5 corresponding to the distance $L_1$), the portion of the chain 5 extending between the left cam sprocket 4 and the roller 8 of the chain guide 6 closest to the left cam sprocket 4 (portion of the chain 5 corresponding to the distance $L_2$), the portion of the chain 5 extending between the crank sprocket 2 and the roller 8 of the tension side chain guide 7 closest to the crank sprocket 2 (portion of the chain 5 corresponding to the distanced $L_3$), and the portion of the chain 5 extending between the right cam sprocket 4 and the roller 8 of the chain guide 7 closest to the right cam sprocket 4 (portion of the chain 5 corresponding to the distance $L_4$). As a result thereof, the excitation frequency $\omega$ from the crankshaft 1 never coincides with the natural frequency $\omega_0$. Therefore, it is possible to prevent the resonance of the chain 5, and thus to restrain the vibration sound of the chain 5.

Due to the same reason as described above, distance P(m) between the contact points of the portion of the chain 5 extending between each adjacent pair of rollers 8 of the loose side chain guide 6 (in FIG. 1, any of the portions of the chain 5 extending in a straight line, respectively, between the adjacent pairs of rollers 8 of the chain guide 6) is set to satisfy the following inequality (4):

$$P < \frac{1}{2\omega_{MAX}}\sqrt{\frac{T}{\rho}} \qquad (4)$$

Similarly, distance P (m) between the contact points of the portion of the chain 5 extending between each adjacent pair of rollers 8 of the tension side chain guide 7 is also set to satisfy the above inequality (4).

By setting the respective distances P in this way, it is possible to prevent the resonance of the chain 5 at all of the portions of the chain 5 extending, respectively, between the adjacent pairs of rollers 8 of the chain guides 6 and 7, and thus to very effectively restrain the vibration sound of the chain 5.

As described above, in the chain transmission device of this embodiment, when the excitation frequency $\omega$ from the crankshaft 1 changes within the range between 0 (zero) and the maximum value $\omega_{MAX}$, the excitation frequency $\omega$ from the crankshaft 1 never coincides with the natural frequency $\omega_0$ of the chain 5 at all of the portions of the chain 5 extending, respectively, between the three sprockets and the four rollers 8 of the chain guides 6 and 7 closest to the respective sprockets. Therefore, it is possible to very effectively restrain the vibration sound of the chain 5, and thus to guide the chain 5 very quietly in the chain transmission device.

In the above embodiment, for the loose side chain guide 6, the roller 8 closest to the crank sprocket 2, and the roller 8 closest to the left cam sprocket 4 are each arranged so as to satisfy the inequality (1) in view of the relationship with the crank sprocket 2 or the left cam sprocket 4. However, it is sufficient that at least one of the two rollers 8 is arranged so as to satisfy the inequality (1) in view of the relationship with the crank sprocket 2 or the left cam sprocket 4. The same is applied to the tension side chain guide 7.

It is preferable to set the distance $L_1$ at the portion of the chain 5 extending between the crank sprocket 2 and the roller 8 of the loose side chain guide 6 closest to the crank sprocket 2 (at the portion of the chain 5 corresponding to the distance $L_1$) so as to satisfy the above inequality (1). The reason is that since the resonance of the chain 5 is likely to occur especially at the portion of the chain 5 extending between the crank sprocket 2 and the roller 8 of the chain guide 6 closest to the crank sprocket 2, so that a vibration sound is likely to occur especially from this portion of the chain 5, by preventing the resonance of the chain 5 at this portion of the chain 5, it is possible to effectively restrain the vibration sound of the chain 5.

Taking into consideration the fact that the chain 5 is stretched after prolonged use, the chain transmission device is sometimes intentionally designed such that the roller 8 of the loose side chain guide 6 closest to the crank sprocket 2 (i.e., the roller 8 located at the end of the chain guide 6 on the side of the crank sprocket 2) does not come into contact with the chain 5 at an early stage of use. In this design/arrangement, as the chain 5 is stretched, the loose side chain guide 6 pivots in the direction in which the chain guide 6 absorbs slackness of the chain 5, so that the roller 8 of the chain guide 6 closest to the crank sprocket 2 comes into contact with the chain 5. In this case, though the roller 8 of the chain guide 6 closest to the crank sprocket 2 is not in contact with the chain 5 at an early stage, in view of the future stage at which the chain has been stretched, the portion of the chain 5 extending between the crank sprocket 2 and the roller 8 of the chain guide 6 closet to the crank sprocket 2 is set to satisfy the inequality (1).

In the above embodiment, as one example, the complete rolling-type chain guides 6 and 7 are described, in which only the rollers 8 come into contact with the chain 5, and no member or no portion of each chain guide comes into sliding contact with the chain 5. However, the present invention may also be applied to a chain transmission device including hybrid-type chain guides in which the rollers 8 coming into rolling contact with the chain 5, and shoes coming into sliding contact with the chain 5 are used together. Namely, even when such hybrid-type chain guides are used, for each of the chain guides, if the chain 5 has a portion extending in a straight line between at least one of the sprockets 2 and 4 and the roller 8 closest to the sprocket, it is sufficient that at this portion of the chain 5, the distance $L_1$, $L_2$, $L_3$ or $L_4$ is set to satisfy the above inequality (1).

DESCRIPTION OF REFERENCE NUMERALS

1: crankshaft
2: crank sprocket
3: camshaft
4: cam sprocket
5: chain
6: loose side chain guide
7: tension side chain guide
8: roller

The invention claimed is:
1. A chain transmission device comprising:
a crank sprocket attached to a crankshaft of an engine;
a cam sprocket attached to a camshaft of the engine;
a chain trained around the crank sprocket and the cam sprocket; and
a chain guide including a plurality of rollers arranged along a direction in which the chain is configured to move while being spaced apart from each other, and configured to guide the chain,
wherein the rollers include a first roller and a second roller, and
wherein the chain forms a first straight portion extending in a straight line between the crank sprocket and the first roller, and a second straight portion extending in a straight line between the cam sprocket and the second roller, wherein each of the first straight portion and the second straight portion of the chain has contact points which are spaced apart from each other by a distance L, expressed in meters, and wherein the distance L between the contact points of at least one of the first straight portion and the second straight portion of the chain is set to satisfy the following inequality:

$$L < \frac{1}{2\omega_{MAX}} \sqrt{\frac{T}{\rho}},$$

where $\omega_{MAX}$ is a maximum excitation frequency, expressed in hertz, from the crankshaft, $\rho$ is a mass of the chain per unit length, expressed in kilograms per meter, and T is a time-average tension of the chain, expressed in newtons, wherein the chain has a portion extending between each adjacent pair of the rollers of the chain guide, and having contact points spaced apart from each other by a distance P, expressed in meters, and wherein the distance P between the contact points of at least one of the portions extending between the corresponding adjacent pairs of the rollers is set to satisfy the following inequality:

$$P < \frac{1}{2\omega_{MAX}} \sqrt{\frac{T}{\rho}}.$$

2. The chain transmission device according to claim 1, wherein the chain guide comprises a loose side chain guide arranged so as to guide a portion of the chain configured to move from the crank sprocket to the cam sprocket, and wherein the first roller is one of the rollers located at an end of the loose side chain guide on a side of the crank sprocket, and the at least one of the first straight portion and the second straight portion of the chain, of which the distance L between the contact points is set to satisfy the inequality $$L < \frac{1}{2\omega_{MAX}} \sqrt{\frac{T}{\rho}},$$

comprises the first straight portion of the chain.

3. The chain transmission device according to claim 2, wherein each of the distance L between the contact points of the first straight portion of the chain and the distance L between the contact points of the second straight portion of the chain is set to satisfy the inequality $$L < \frac{1}{2\omega_{MAX}} \sqrt{\frac{T}{\rho}}.$$

4. The chain transmission device according to claim 1, wherein each of the distance L between the contact points of the first straight portion of the chain and the distance L between the contact points of the second straight portion of the chain is set to satisfy the inequality $$L < \frac{1}{2\omega_{MAX}} \sqrt{\frac{T}{\rho}}.$$

* * * * *